United States Patent [19]
Fortin et al.

[11] Patent Number: 6,026,236
[45] Date of Patent: Feb. 15, 2000

[54] SYSTEM AND METHOD FOR ENABLING SOFTWARE MONITORING IN A COMPUTER SYSTEM

[75] Inventors: Michael Richard Fortin; Robert John Urquhart, both of Austin, Tex.

[73] Assignee: International Business Machines Corporation, Armonk, N.Y.

[21] Appl. No.: 08/868,386

[22] Filed: Jun. 3, 1997

Related U.S. Application Data

[63] Continuation of application No. 08/400,779, Mar. 8, 1995.
[51] Int. Cl.[7] .................................................. G06F 11/32
[52] U.S. Cl. ............................... 395/704; 714/38; 714/39
[58] Field of Search ......................... 395/183.14, 183.15, 395/704; 714/38, 39

[56] References Cited

U.S. PATENT DOCUMENTS

| | | | |
|---|---|---|---|
| 4,866,665 | 9/1989 | Hasell-Smith | 395/183.11 |
| 5,129,087 | 7/1992 | Will | 395/704 |
| 5,485,574 | 1/1996 | Bolosky et al. | 395/183.11 |
| 5,539,907 | 7/1996 | Srivastava et al. | 395/704 |
| 5,715,440 | 2/1998 | Ohmura et al. | 395/580 |
| 5,732,273 | 3/1998 | Srivastava et al. | 395/704 |

*Primary Examiner*—Alvin E. Oberley
*Assistant Examiner*—St. John Courtenay, III
*Attorney, Agent, or Firm*—Marilyn Smith Dawkins; Mark S. Walker

[57] ABSTRACT

A method and system for enabling the monitoring of software executing on a computer system. The system inserts monitor instrumentation without recompiling the source code of the program. Encapsulation of the target routine does not disrupt the relative addressing of the target routine since an instruction is simply replaced. No instructions are added to the target routine. User specified entry and exit routines are used to collect selected performance and system state data. Instrumentation code is provided to link the target routines to the user specified entry and exit routines. The standard link interface allows the entry and exit routines to be written in high level languages.

11 Claims, 3 Drawing Sheets

Diagram of program flow after encapsulation.

(A) NORMAL FLOW (B) ENCAPSULATED FLOW

Diagram of program flow after encapsulation.

SYSTEM AND METHOD FOR ENABLING SOFTWARE MONITORING IN A COMPUTER SYSTEM

This application is a continuation of U.S. Ser. No. 08,400,779 filed Mar. 8, 1995.

RELATED APPLICATIONS

The present invention is related to application Ser. No. 08/161,966 filed Dec. 3, 1993 having the title "System and Method for Enabling Shared Library Software Monitoring in a Computer System", now abandoned.

BACKGROUND OF THE INVENTION

1. Field of the Invention

The present invention relates generally to measuring the performance of computer systems. More particularly, it relates to the introduction of system monitoring routines to software operating on a computer system. Still more particularly, the present invention relates to computer implemented methods and computer apparatus for enabling a computer system to collect information during the execution of software on that computer system.

2. Background and Related Art

Computer system performance, e.g. the speed of operation or the throughput of a system, is a function of the computer system hardware and the efficiency of the software used on the system. Performance can be enhanced by ensuring that the software is efficiently written to most effectively use the hardware or by modifying the hardware to enhance certain software function.

The identification of performance problems requires an ability to monitor the execution of software on a particular hardware system and to be able to identify those sections of the software that are consuming inordinate amounts of hardware resource. For example, the execution of a software program can be monitored to determine how much processing time is spent in each subroutine.

Tracing program execution and monitoring execution adds significant overhead to program execution. Thus, most software does not include monitoring function in its basic form. Software developers may add instructions to the software to monitor selected portions, but these instructions are typically removed before the final version is shipped to customers or placed in regular use.

Introduction of an existing program onto new hardware or perception of performance problems in new software may create a requirement to monitor software that does not contain any inherent monitoring capability. This creates a need to "instrument" the software to measure performance. Instrumentation of software refers to the process of enabling the software to be monitored at selected points to capture significant system state data at those points.

Historically, instrumentation of software was accomplished by modifying the source code for the software to include monitoring instructions, recompiling the source code, and then executing the modified software. The approach has the disadvantages of requiring access to source code (which may not be available for commercially purchased software), and being error prone if the person modifies the code incorrectly. In addition, this form of instrumentation may introduce performance problems itself causing the results to be misleading.

A second approach to instrumentation uses special purpose hardware to record access to certain computer system functions. A special monitor is connected to the computer to record changes in the physical state of the machine, e.g. when a signal is received on a certain line or when certain memory addresses are accessed. This approach has the disadvantage of requiring the special purpose hardware. It is also limited to those functions that cause a recognizable physical change to the hardware. The approach is costly and not generally applicable.

Yet another approach has been suggested in U.S. Pat. No. 5,193,180 to Hastings. Hastings seeks to monitor memory access by expanding the program code to include specific monitoring instructions. Hastings avoids the need for source code by expanding relocatable binary files. However, the files to be expanded must have a full symbol table available because of the movement of relative locations due to the expansion. The technique is also not applicable to situations where the symbol table has been stripped from an executable object to save storage space. Finally, Hastings cannot be applied to an object already loaded into memory for execution due to the need to recalculate relative addresses.

Still another approach is suggested in commonly assigned application Ser. No. 07/662,251, bearing Attorney Docket Number AT991-001 entitled "System and Method for Computer System Profiling." This method is non-invasive and does not require modifying the code being monitored. The system and method are implemented in a software program that samples instruction addresses to be executed by the system. Summarization of the number of times an address is referenced and correlation to the source code causing generation of that instruction provides statistics on the time the program spends in certain sections of code. This approach has the disadvantage of being limited to estimating time spent in code sections and not allowing collection of other system state information. It also requires the source code to be available to generate an assembly listing for address to code correlation.

A technical problem therefore exists to provide a means of instrumenting a program for user defined performance monitoring without access to the program source code and without requiring special purpose hardware monitors.

SUMMARY OF THE INVENTION

The present invention is directed to providing a system and method for enabling monitoring of software performance without requiring access to the software source code.

The present invention is directed to a method for monitoring a computer system executing at least one software program having a plurality of computer executable instructions, the method comprising the steps of: replacing one of the plurality of computer executable instructions with an instruction causing execution to branch to a monitor process; performing the monitor process; executing the replaced one of the plurality of computer executable instructions; and returning execution control to the plurality of computer executable instructions.

It is therefore an object of the invention to provide a system and method for efficiently instrumenting software designed to operate on a computer system.

It is yet another objective to provide a system and method that enables instrumenting of software without requiring access to the software source code and without recompilation.

It is yet another objective of the invention to provide a system and method for instrumenting software after that software has been loaded for execution in a computer system.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The preferred embodiment of the present invention operates on a computer system having a processing unit, system memory and various input/output and other peripheral devices. The preferred embodiment operates on and IBM RISC System/6000 computer running the AIX operating system. (IBM, RISC System/6000, and AIX are trademarks of the IBM Corporation.) It will be understood, however, that the invention can be implemented on other hardware platforms and on other operating systems.

Figure 1:
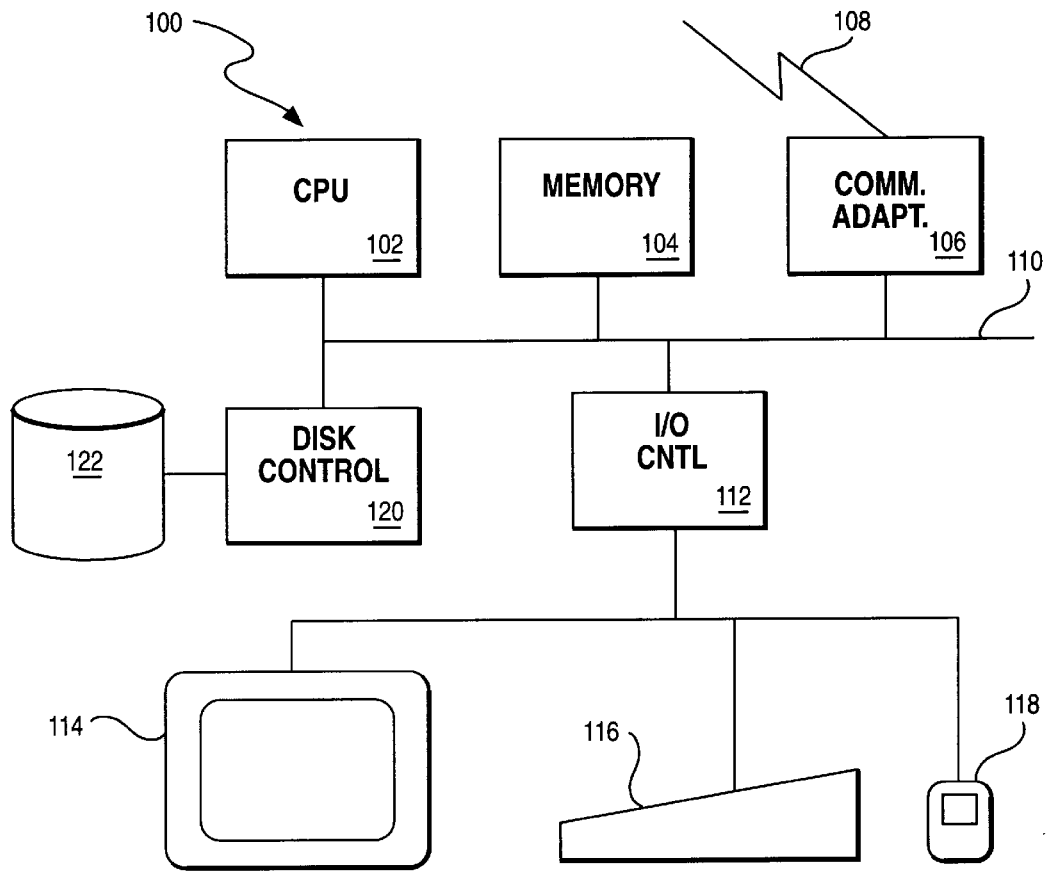
FIG. 1 is a block diagram illustrating a computer system on which the preferred embodiment of the present invention operates.

The preferred embodiment is implemented with a computer system having the components shown generally for the system 100 in FIG. 1. Processing is provided by central processing unit or CPU 102. CPU 102 acts on instruction and data stored in random access memory 104. Long term storage is provided on one or more disks 122 operated by disk controller 120. A variety of other storage media could be employed including tape, CD-ROM, or WORM drives. Removable storage media may also be provided to store data or computer process instructions. Operators communicate with the system through I/O devices controlled by I/O controller 112. Display 114 presents data to the operator while keyboard 114 and pointing device 118 allow the operator to direct the computer system. Communications adapter 106 controls communications between this processing unit and others on a network to which it connected by network interface 108.

Instrumentation of software leads to the monitoring of a "target routine", i.e. that portion of the software for which data is to be collected. The target routine can be a complete program, a subroutine of a program, or a routine from a routine library. A routine library or subroutine library is a collection of useful software that may be used by a programmer to accomplish a desired function without having to specifically create source code for the function. For example, various mathematical functions such as sine, cosine, tangent, etc. can be collected into a library of math routines. While a library usually includes a number of routines, the term is often used to refer to even a single routine designed to be called by another program. A shared library, once loaded, is accessible to many processes or users on the system.

Figure 2:
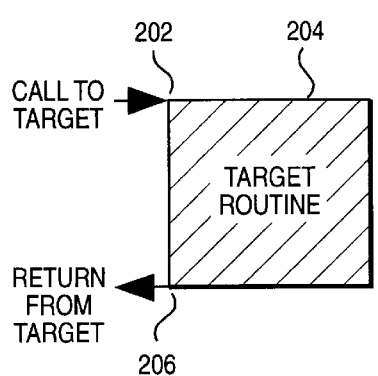
FIG. 2 is a flow diagram illustrating the normal flow of control to and from a target routine.

Each target routine has one or more entry points and one or more exit points. A target routine is invoked or called by a previous routine. The processor will transfer control to the target routine entry point. Instructions from the target routine will be executed until an exit back to the calling routine is encountered. The target routine instructions may include an invocation of another subroutine. In some cases, control will transfer to another routine and will never be returned to the calling routine. The flow of control is illustrated in FIG. 2. In FIG. 2 the "Call to Target" transfers control to the instruction at address 202. Target routine instructions 204 are executed until control is returned to the calling program at 206.

Figure 3:
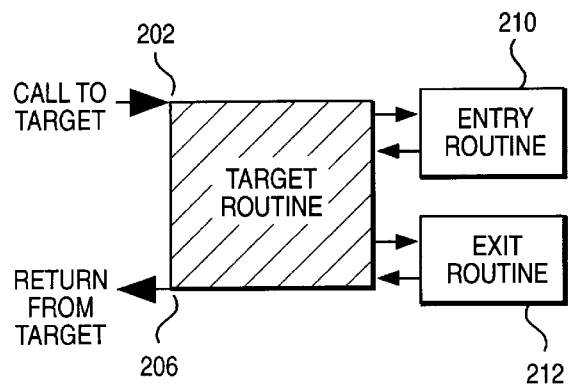
FIG. 3 is a flow diagram illustrating the flow of control in an instrumented target routine according to the present invention.

Enabling routine monitoring allows system state information to be collected at entry to the target routine and at exit from the routine. Entry and Exit monitoring provide statistics on how much time is spent in any routine and an ability to determine what changes to the system are caused by that routine. The flow of control after instrumentation according to the present invention is shown in FIG. 3. The Call to Target still points to address 202. After 202, however, control is passed to Entry Routine 210. Entry Routine 210 collects the information desired by the monitor and returns control to the target routine. Upon Exit from the Target Routine, control is passed to an Exit Routine 212 that collects additional data.

The present invention permits the Entry and Exit Routines to be written in a high level language such as C thereby making monitoring easier for the average programmer. This flexibility allows the programmer to collect precisely the information needed without introducing a great deal of complexity into the monitoring process. Within the Entry and Exit routines, the programmer can direct the system to send data to a printer, to a file, to the console, or to a shared memory segment. The routines also allow the function of a library member to be fully replaced such that newly provided code will be executed instead of the base code in the library being monitored.

Figure 6:
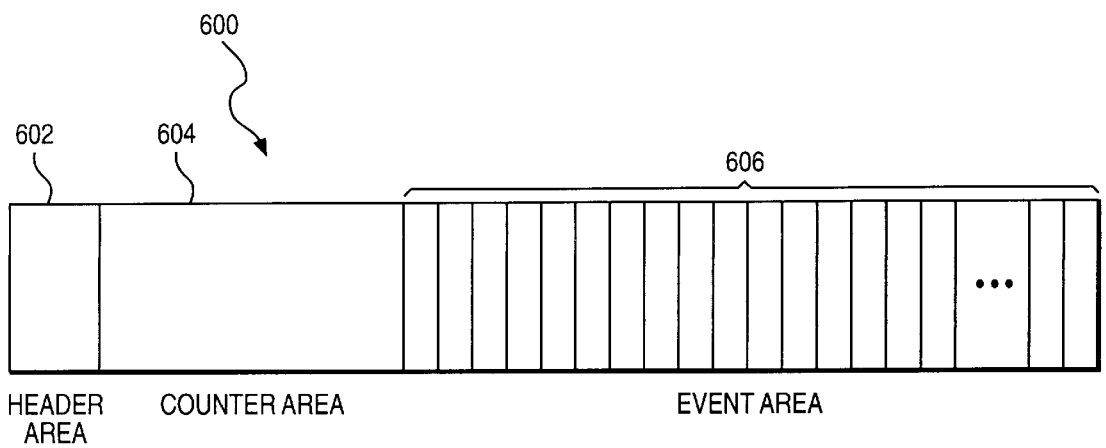
FIG. 6 is a diagram illustrating the layout of a shared memory segment used in the recording data in the present invention.

An example of a shared memory segment for collecting monitor events is shown in FIG. 6. The shared memory segment 600 is an allocated area in the system memory that is defined as accessible to multiple processes. The segment preferably includes a header area 602, a counter area 604 for recording counts of selected events, and a event area 606 for recording a number of monitor events. The size of the memory segment is alterable based on the user requirements. The size allocated determines the total number of monitor events that can be captured in event area 606. Although this shared segment structure is preferred, other structures can be used within the scope of the invention.

Figure 4:
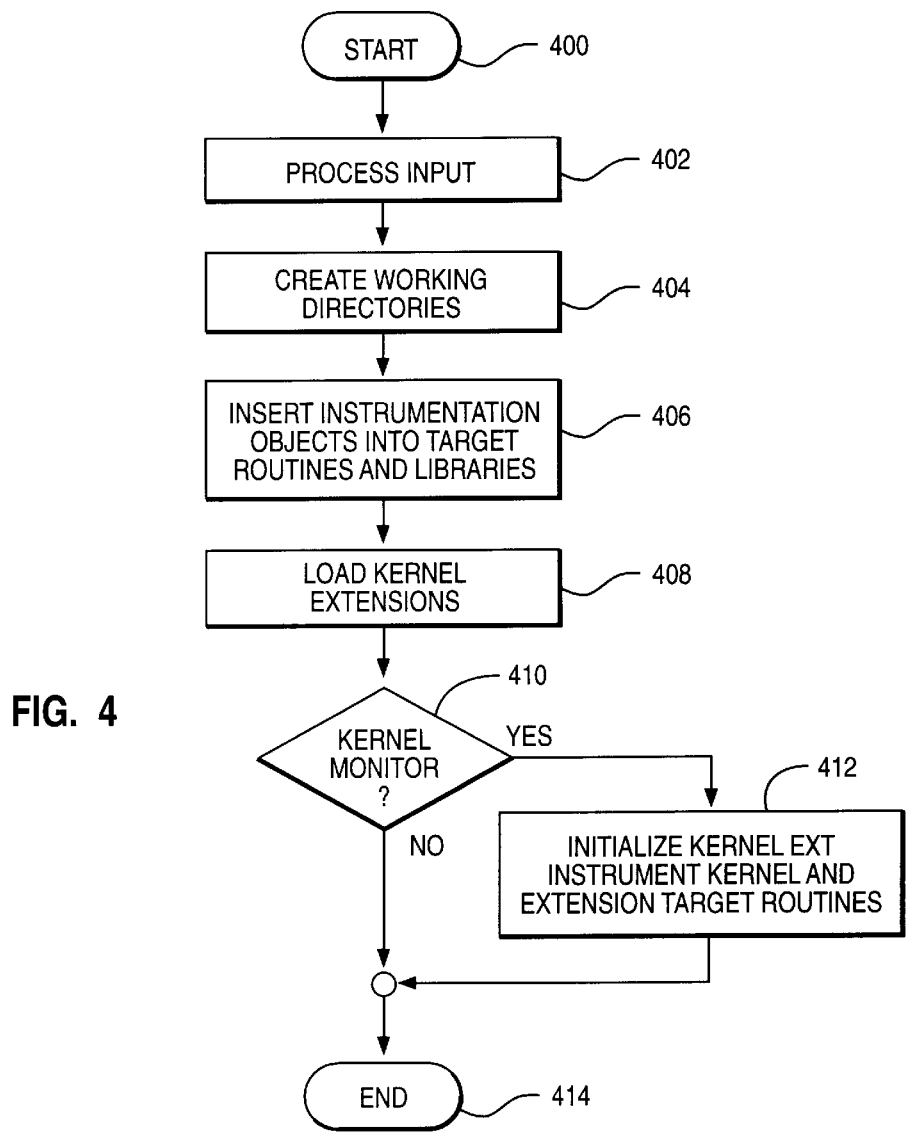
FIG. 4 is a flowchart depicting the steps of the instrumentation process according to the present invention.

The system and method of the present invention enable software monitoring by instrumenting the target routines selected by the user. The system and method perform the necessary target routine modifications thereby eliminating potential errors caused by incorrect manual modifications. FIG. 4 is a flowchart depicting the steps in instrumenting a target routine or library of target routines according to the present invention.

The user invokes the present invention by specifying the target routines and type of monitoring. This information leads to the Start of processing 400. The input is processed 402 to determine the actions required. Working directories for holding modified target routines are created 404. Next, instrumentation objects are inserted into the target routines and libraries 406. Kernel extensions are loaded 408. The kernel extensions allow certain forms of processing to be employed.

The insertion of instrumentation objects, step 406 involves modifying the software to cause execution of the entry and exit routines specified by the user. The preferred embodiment of the present invention is particularly suited to instrument programs following the C language linkage conventions. Programs written in languages other than C often follow these conventions. Instrumentation of the software is accomplished, in part, by changing portions of the executable code. The changed portions are identified by analysis of the linkage conventions. Executable software embodying linkage conventions other than the C linkage conventions may be instrumented using this technique. Extension of the preferred embodiment to these other linkage cases can be accomplished using known techniques.

The method of instrumenting a target routine depends on the type of target routine. Instrumentation of executable programs that have not been stripped of their symbol table ("unstripped routines") will be described first. Descriptions for instrumentation of stripped routines will follow.

Figure 5:
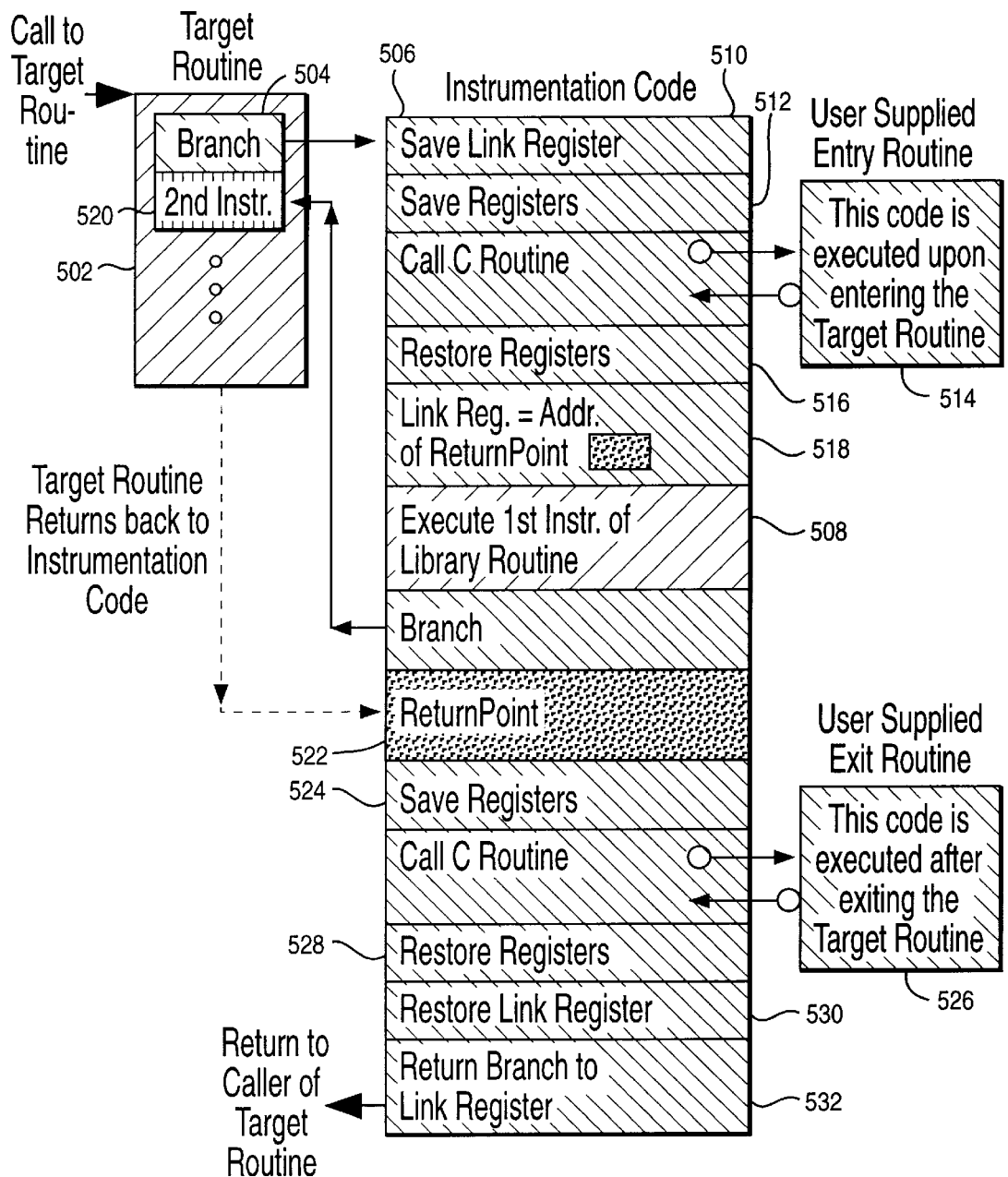
FIG. 5 is a diagram illustrating the detailed flow of execution in a system according to the present invention.

The general flow of an instrumented target routine is shown in FIG. 5. A target routine 502 is instrumented or encapsulated by causing the routine to branch to the instrumentation or monitor code. Instrumentation of an unstripped routine preferably links the instrumentation code with the target routine object file. This allows the target routine and instrumentation code to use the same Table of Contents or TOC and removes the requirement of creating a separate Table of Contents for the instrumentation code thereby saving space. If a library routine is being instrumented, it must first be extracted from the library, the target routine code linked with the instrumentation code, and the newly formed object file archived back into the library.

The instrumentation routine then locates the first instruction of the archived target routine and copies it to the instrumentation code at 508. The first instruction is replaced with a branch instruction 504 to the instrumentation code 506.

The flow of execution in an instrumented system is as follows:

The target routine is called by another program. The first instruction encountered is a branch to the instrumentation code 504. Instrumentation code 506 saves the link register 510, saves the other registers 512, and calls the user supplied entry routine 514. The entry routine collects the requested data. The registers are restored 516 the link register is set to the address of a return point in the instrumentation code 518. The first target routine instruction is executed 508 and control returned to the target routine second instruction 520. Upon completion of processing, control returns to the instrumentation routine 522. The registers are saved 524 and the exit routine called 526. The exit routine collects data requested on exit. The registers are restored 528, the original link register restored 530, and a branch is taken back to the address specified in the link register 532.

The instrumentation code 506 provides a compact standard mechanism for transferring control from the target routine to the monitoring routines. User supplied routines 514, 526 can be written in C or other high level language and can capture any required system state information. An ability to set and monitor a timer allows the entry/exit routine combination to collect data on the amount of time spent in each routine.

Stripped executable modules cannot be linked with the instrumentation code. Instrumenting of stripped target routines therefore requires a slightly different approach. The instrumentation code 506 is stored in a library of entry and exit routines. Each of the library instrumentation routines, in turn, invokes a user supplied entry or exit routine for collecting data. The loader section of the target routine is modified to create a dependency on the newly created instrumentation library and to cause that library to be loaded prior to executing the first instruction of the target routine.

The text section of the target routine is expanded to include entry/exit code for calling the instrumentation library routines. The data section of the target routine is expanded to provide storage for TOC entries of the instrumentation library making them addressable from the target routine. The first instruction of the target routine is copied to a specific offset within the inserted entry/exit code. A branch from the target routine to the entry section of the inserted entry/exit code replaces the first instruction of the target routine. The flow of execution is then as described above.

The only modification to the target routine is the replacement of the first instruction by a branch instruction. The entry/exit code is appended to the target routine but does not expand or disrupt the instruction sequence of the target routine.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A computer implemented method comprising:

monitoring, automatically, an execution of a plurality of routines executing on a computer system, each of the routines having a separate plurality of computer executable instructions, the step of monitoring further comprising the steps of:

receiving a selection, from a user, of at least one of the routines to be monitored and a corresponding user supplied high level language routine from a plurality of user supplied routines for user defined performance monitoring of the selected routine;

automatically performing modifications to the selected routine to replace one of said plurality of computer executable instructions, at an entry point to the selected routine, with a branch instruction causing execution to branch to a monitor process;

calling automatically, from the monitor process, the selected user supplied routine as an entry monitor, selected specifically for the selected routine, to perform the user defined performance monitoring upon entry to the selected routine;

automatically returning to the monitor process from the entry monitor upon completion of the entry monitor;

performing, by the monitor process, a plurality of monitoring instructions common to each of the plurality of routines;

executing, within the monitor process, the replaced one of said plurality of computer executable instructions of the selected routine; and returning execution control to said plurality of computer executable instructions of the selected routine after executing within the monitor process the replaced computer executable instruction.

2. The method of claim 1, further comprising the steps of:

returning execution control to the monitor process upon completion of said plurality of computer executable instructions of the selected routine; and calling automatically, from the monitor process, a second selected user supplied routine as an exit monitor, selected specifically for the selected routine, to perform user defined performance monitoring upon exit from the selected routine.

3. The method of claim 2 further comprising determining, from the entry and exit monitor, the time spent while executing the selected routine.

4. A computer implemented method comprising:

automatically monitoring an execution of a plurality of routines executing on a computer system, each of the routines having a separate plurality of computer executable instructions, the step of automatically monitoring comprising;

receiving a selection, from a user, of at least one of the routines to be monitored and separate corresponding user supplied high level language entry and exit routines from a plurality of user supplied entry and exit routines for performing user-defined performance monitoring for each selected one of the plurality of routines;

automatically performing selected routine modifications to replace a first one of said plurality of computer executable instructions of each selected routine, at an entry point of each selected routine executing, with a branch instruction causing execution to branch to a monitor process;

calling automatically, from the monitor process, the selected user supplied entry routine as an entry monitor, selected specifically for the selected routine, to perform the user defined performance monitoring upon entry to the selected routine;

automatically returning to the monitor process from the entry monitor upon completion of the entry monitor;

performing, by the monitor process, a plurality of monitoring instructions common to each of the plurality of routines;

executing, within the monitor process, the replaced one of said plurality of computer executable instructions of the executing selected routine;

returning execution control to the plurality of computer executable instructions of the executing selected routine after executing within the monitor process the replaced computer executable instruction;

returning execution control to the monitor process upon completion of said plurality of computer executable instructions of the executing selected routine; and calling automatically, from the monitor process, the selected user supplied exit routine as an exit monitor, selected specifically for the executing selected routine being monitored, to perform user defined performance monitoring upon exit from the executing selected routine.

5. A computer system, having memory and a processor, comprising:

means for automatically monitoring an execution of a plurality of routines executing on a computer system, each of the routines having a separate plurality of computer executable instructions;

the means for monitoring further comprising:

a monitor process, stored in memory, common to each of the plurality of routines, having means for replacing one of said plurality of computer executable instructions of a specified routine, at an entry to the specified routine, with a branch instruction causing execution to branch to the monitor process;

means for calling, from the monitor process, a user supplied high level language entry monitor, preselected specifically for the specified routine, to perform user defined performance monitoring upon entry to the specified routine;

means for performing, by the monitor process, a plurality of monitoring instructions common to each of the plurality of routines;

means for executing, within the monitor process, the replaced one of said plurality of computer executable instructions of the specified routine; and means for returning execution control to said plurality of computer executable instructions of the specified routine after executing within the monitor process the replaced computer executable instruction.

6. The system of claim 5 further comprising:

means for receiving a return execution control from the specified routine to the monitor process upon completion of said plurality of computer executable instructions of the specified routine; and means for calling, from the monitor process, a user supplied high level language exit monitor, pre-selected specifically for the specified routine, to perform user defined performance monitoring upon exit from the specified routine.

7. The system of claim 6 further comprising means for determining, from the performance monitoring performed by the entry and exit monitor, the time spent while executing the specified routine.

8. A computer system, having memory and a processor, comprising:

means for automatically monitoring an execution of a plurality of routines executing on a computer system, each of the routines having a separate plurality of computer executable instructions, the means for automatically monitoring comprising;

means for replacing a first one of said plurality of computer executable instructions of each routine, upon entry of each routine executing, with a branch instruction causing execution to branch to the automatic monitor means;

means for calling, from the monitor means, a user supplied high level language entry monitor, pre-selected specifically for the executing routine, to perform user defined performance monitoring upon entry to the executing routine;

means for performing, by the monitor means, a plurality of monitoring instructions common to each of the plurality of routines;

means for executing, within the monitor means, the replaced one of said plurality of computer executable instructions of the executing routine;

means for returning execution control to the plurality of computer executable instructions of the executing routine after executing within the monitor means the replaced computer executable instruction;

means for returning execution control to the monitor means upon completion of said plurality of computer executable instructions of the executing routine; and means for calling, from the monitor means, a user supplied high level language exit monitor, pre-selected specifically for the executing routine being monitored, to perform user defined performance monitoring upon exit from the executing routine.

9. A computer program, on a computer usable medium, comprising:

means for causing an automatic monitoring of a plurality of routines executing on a computer system, each of the routines having a separate plurality of computer executable instructions;

the means for causing the automatic monitoring further comprising:

a monitor process, common to each of the plurality of routines, having means for causing a replacing of one of the plurality of computer executable instructions of a specified routine, at an entry to the specified routine, with a branch instruction causing execution to branch to the monitor process;

means for calling, from the monitor process, a user supplied high level language entry monitor, pre-selected specifically for the specified routine, to perform user defined performance monitoring upon entry to the specified routine;

means for performing a plurality of monitoring instructions common to each of the plurality of routines;

means for executing, within the monitor process, the replaced one of said plurality of computer executable instructions of the specified routine; and means for returning execution control to said plurality of computer executable instructions of the specified routine.

10. The computer program, on a computer usable medium, of claim 9 further comprising:

means for receiving a return execution control from the specified routine to the monitor process upon completion of said plurality of computer executable instructions of the specified routine; and means for calling, from the monitor process, a user supplied high level language exit monitor, pre-selected specifically for the specified routine, to perform user defined monitoring upon exit from the specified routine.

11. A computer program, on a computer usable medium, comprising:

means for causing an automatic monitoring of a plurality of routines executing on a computer system, each of the routines having a separate plurality of computer executable instructions, the means for causing the automatic monitoring comprising;

means for replacing a first one of said plurality of computer executable instructions of each routine, upon entry of each routine executing, with a branch instruction causing execution to branch to the monitor means;

means for calling, from the monitor means, a user supplied high level language entry monitor, pre-selected specifically for the executing routine, to perform user defined performance monitoring upon entry to the executing routine;

means for performing, by the monitor means, a plurality of monitoring instructions common to each of the plurality of routines;

means for executing, within the monitor means, the replaced one of said plurality of computer executable instructions of the executing routine;

means for returning execution control to the plurality of computer executable instructions of the executing routine;

means for returning execution control to the monitor means upon completion of said plurality of computer executable instructions of the executing routine; and means for calling, from the monitor means, a user supplied high level language exit monitor, pre-selected specifically for the executing routine being monitored, to perform user defined performance monitoring upon exit from the executing routine.

* * * * *

UNITED STATES PATENT AND TRADEMARK OFFICE
CERTIFICATE OF CORRECTION

PATENT NO.    : 6,026,236
DATED         : February 15, 2000
INVENTOR(S)   : Fortin et al.

It is certified that error appears in the above-identified patent and that said Letters Patent is hereby corrected as shown below:

Column 8, claim 9,
Line 66, after "program" please add -- having computer readable program code means --;

Column 9, claim 10,
Line 27, after "program" pleasd add -- having computer readable program code means --;

Column 10, claim 11,
Line 1, after "program" please add -- having computer readable program code means --.

Signed and Sealed this

Twelfth Day of February, 2002

Attest:

JAMES E. ROGAN
*Attesting Officer*     *Director of the United States Patent and Trademark Office*